US012743861B2

(12) United States Patent
Ignatchenko et al.

(10) Patent No.: US 12,743,861 B2
(45) Date of Patent: Sep. 22, 2026

(54) SYSTEMS AND METHODS FOR RUNTIME CONSTRUCTION OF THREE-DIMENSIONAL URBANISTIC LANDSCAPES

(71) Applicant: Six Impossible Things Before Breakfast Limited, Dublin (IE)

(72) Inventors: Sherry Ignatchenko, Weidling (AT); Dmytro Ivanchykhin, Kiev (UA)

(73) Assignee: Six Impossible Things Before Breakfast Limited, Dublin (IE)

( * ) Notice: Subject to any disclaimer, the term of this patent is extended or adjusted under 35 U.S.C. 154(b) by 248 days.

(21) Appl. No.: 18/602,195

(22) Filed: Mar. 12, 2024

(65) Prior Publication Data

US 2024/0312170 A1 Sep. 19, 2024

Related U.S. Application Data

(60) Provisional application No. 63/489,891, filed on Mar. 13, 2023.

(51) Int. Cl.
*G06T 19/00* (2011.01)
*A63F 13/52* (2014.01)
*G06T 19/20* (2011.01)

(52) U.S. Cl.
CPC .............. *G06T 19/20* (2013.01); *A63F 13/52* (2014.09); *G06T 2219/2016* (2013.01); *G06T 2219/2021* (2013.01)

(58) Field of Classification Search
None
See application file for complete search history.

(56) References Cited

U.S. PATENT DOCUMENTS 10,055,876 B2 * 8/2018 Ford ..................... G06T 15/005
10,636,209 B1 * 4/2020 Thaller ................... G06T 17/20
(Continued)

FOREIGN PATENT DOCUMENTS

CN 108 176 048 A 6/2018
CN 111 672 100 B 12/2021
(Continued)

OTHER PUBLICATIONS

"Alpha compositing," *Wikipedia, the Free Encyclopedia*, Feb. 13, 2024 (last visited Feb. 23, 2024), available at https://en.wikipedia.org/wiki/Alpha_compositing.
(Continued)

*Primary Examiner* — Martin Mushambo
(74) *Attorney, Agent, or Firm* — Arnold & Porter Kaye Scholer LLP

(57) ABSTRACT

The systems and methods described herein provide techniques for constructing during runtime, on a client computer system, three-dimensional objects to be rendered within a virtual scene. In various implementations, meshes and/or textures for the objects to be rendered within a virtual scene may be stored at a client computer system. Stored meshes and/or textures may comprise meshes and textures associated with resizable and non-resizable portions of the target three-dimensional model. The client computer system may be configured to perform runtime construction of the target three-dimensional model based on the stored meshes and/or textures, and the target model may be used to render one or more objects within a virtual scene. Generating the three-dimensional virtual scene may comprise constructing individual objects within the virtual scene, with at least one of appearance, size, and position being randomized.

36 Claims, 5 Drawing Sheets

(56) References Cited

U.S. PATENT DOCUMENTS

| | | | |
|---|---|---|---|
| 11,666,825 | B2 | 6/2023 | Delamont |
| 2004/0028049 | A1 | 2/2004 | Wan |
| 2015/0213646 | A1* | 7/2015 | Ma ........................... G06T 7/50 345/420 |
| 2019/0259194 | A1* | 8/2019 | Ford ....................... G06T 15/04 |
| 2020/0089954 | A1* | 3/2020 | Zia ......................... G06V 20/64 |
| 2020/0151807 | A1* | 5/2020 | Zhou .................... G06V 10/454 |
| 2020/0368616 | A1 | 11/2020 | Delamont |
| 2021/0082183 | A1* | 3/2021 | Thaller ..................... G06T 3/06 |
| 2021/0335039 | A1* | 10/2021 | Jones ..................... G06V 10/82 |
| 2021/0350620 | A1* | 11/2021 | Bronstein ............ G06N 3/0464 |
| 2022/0189095 | A1* | 6/2022 | Hauswiesner ............ G06T 7/11 |
| 2023/0101230 | A1* | 3/2023 | Hu .......................... G06T 17/00 345/427 |
| 2023/0186567 | A1* | 6/2023 | Koh ........................ G06F 30/12 345/419 |
| 2024/0275404 | A1 | 8/2024 | Ignatchenko |
| 2024/0312112 | A1 | 9/2024 | Ignatchenko |

FOREIGN PATENT DOCUMENTS

| | | |
|---|---|---|
| WO | WO 2024/189539 | 9/2024 |
| WO | WO 2024/189543 | 9/2024 |

OTHER PUBLICATIONS

International Search Report dated Jun. 13, 2024, issued in Int'l Application No. PCT/IB2024/052388.

International Search Report dated Jul. 17, 2024, issued in Int'l Application No. PCT/IB2024/052393.

Lou et al., "Moving curved mesh adaptation for high-order finite element simulations," *Engineering with Computers* 27, pp. 41-50 (Feb. 2010) (Baden-Wuerttemberg, Germany).

"Map Generator: Implementation Details" by ProbableTrain, available at https://github.com/ProbableTrain/MapGenerator/blob/master/docs/algorithmoverview.md (last visited Mar. 6, 2024).

* cited by examiner

SYSTEMS AND METHODS FOR RUNTIME CONSTRUCTION OF THREE-DIMENSIONAL URBANISTIC LANDSCAPES

RELATED APPLICATIONS

This application claims priority to U.S. Provisional Application No. 63/489,891, entitled "Method for Runtime Construction of 3D Urbanistic Landscapes," filed on Mar. 13, 2023, the content of which is hereby incorporated herein by reference in its entirety.

FIELD OF THE DISCLOSURE

The systems and methods described herein relate to improvements in rendering computer-generated three-dimensional models for video games.

BACKGROUND

There is a seemingly infinite number of video games available online. When players master a game or complete all of the objectives in a game, they will often lose interest or find the game boring due to similar or expected responses by game characters or due to the repetitive nature of the three-dimensional scenes that form the backdrop of the game or the world in which the game is played. Accordingly, it would improve replay value of a video game if the variability of the three-dimensional models that make up the game was enhanced without increasing the time and manpower required to create said three-dimensional models.

Scenes within video games often include various three-dimensional objects such as buildings, roads, walls, gates, or other structures. Together, these three-dimensional objects form the backdrop of the game or the world in which the game is played. Conventionally, these three-dimensional scenes are designed manually (i.e., by manually placing the three-dimensional objects). Because three-dimensional objects often have a fixed size, shape, or pattern, this process can be quite tedious. Accordingly, in addition to increasing variability, it would also improve game development if these three-dimensional objects could be generated in an automated manner (in particular, according to desired size).

As three-dimensional online games are often downloaded over the Internet, it would be an improvement if three-dimensional objects could be constructed (or generated) at a client computing device (or gaming device) without having to be re-downloaded repeatedly. This is particularly true of three-dimensional web games, where download times tend to be limited to single-digit minutes (e.g., due to the limited patience of web users), which in turn limits the size for downloads to single-digit gigabytes (or to hundreds of megabytes for mobile connections). As one single three-dimensional model (e.g., consisting of a mesh and textures) can easily take ten megabytes or more, and a landscape can easily consist of hundreds or even thousands of such models (with many other assets also necessary for a game to run), the need to construct multiple three-dimensional models on the client side (e.g., at a client computer system) from the same data (as opposed to downloading already-prepared three-dimensional models from the server side (or game server) becomes apparent. For other (non-web-based) games, a decrease in game downloading sizes (e.g., achievable by constructing three-dimensional models on the client side from the same data) will also be helpful. In particular, it would reduce downloading times and associated user frustration, reduce entry barriers to the game, and reduce download traffic costs.

SUMMARY OF THE DISCLOSURE

This disclosure relates to systems and methods for constructing during runtime, on a client computer system, three-dimensional objects to be rendered within a virtual scene. According to one aspect of the invention, the systems and methods described herein may construct three-dimensional models, which may be used to render three-dimensional objects within a virtual scene. Such constructed three-dimensional objects may be represented by industry-standard three-dimensional models, which may be rendered using already-existing methods. Three-dimensional models constructed (or generated) using one or more of the techniques described herein may be referred to herein as "target three-dimensional models." For example, the constructed target three-dimensional models may comprise industry-standard three-dimensional models for buildings, roads, and/or other types of objects. In various implementations, the constructed target three-dimensional model may be constructed from a set of meshes and textures associated with resizable and non-resizable portions of the target three-dimensional model. Resizable portions may correspond to stored meshes and textures resizable in only one dimension or stored meshes and textures resizable in at least two dimensions. In various implementations, the client computer system may receive instructions to render a constructed three-dimensional model as one or more of three-dimensional objects within a virtual scene. For example, the instructions may be received by a client computer system from a game server. In various implementations, the client computer system may be configured to perform runtime construction of a target three-dimensional model based on the received instructions. For example, the client computer system may resize one or more stored meshes which correspond to resizable portions of a target three-dimensional model. Textures may be similarly resized or tiled to generate the constructed target three-dimensional model. In some implementations, a series of transformations may be applied to stored meshes in the process of construction of the target three-dimensional model. For example, applying one or more transformations to a stored mesh may produce a curved object.

According to another aspect of the invention, the systems and methods described herein may utilize one or more techniques described herein to automatically generate (or "construct") three-dimensional models and/or virtual scenes. In some implementations, a plurality of meshes and/or textures may be stored by the client computer system, and then used for the generation/construction of three-dimensional models to enable the client computer system to render an entire virtual scene at runtime. In some implementations, the generated/constructed model described above may be rendered within a three-dimensional virtual scene comprising objects which use target models generated/constructed based on one or more stored meshes and/or textures. In various implementations, generating the randomized three-dimensional virtual scene may comprise varying, for individual objects within the virtual scene, at least one of appearance, size, and position. Another important property which may be achieved using the methods described herein, is that the methods described allow generation/construction of target three-dimensional models of a desired size. This is in contrast to construction methods which only allow blocks of pre-defined size to be added, so possible resulting sizes have large gaps in them. For example, if constructor would allow only to add another window which is 2 m long, then it may be possible to generate a building that is either X lengths, or X+2 m lengths. The methods described herein, however, may allow generation/construction of a building with any desirable length between X and X+2 m. Technically, generated lengths may be limited by precision of the underlying floating-point numbers, but this is rarely a practical problem in three-dimensional simulations.

These and other objects, features, and characteristics of the systems and/or methods disclosed herein, as well as the methods of operation and functions of the related elements of structure and the combination thereof, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention is illustrated by way of example and not limited in the accompanying figures in which like reference numerals indicate similar elements and in which.

These drawings are provided for purposes of illustration only and merely depict typical or example embodiments. These drawings are provided to facilitate the reader's understanding and shall not be considered limiting of the breadth, scope, or applicability of the disclosure. For clarity and case of illustration, these drawings are not necessarily drawn to scale.

DETAILED DESCRIPTION

Certain illustrative aspects of the systems and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1:
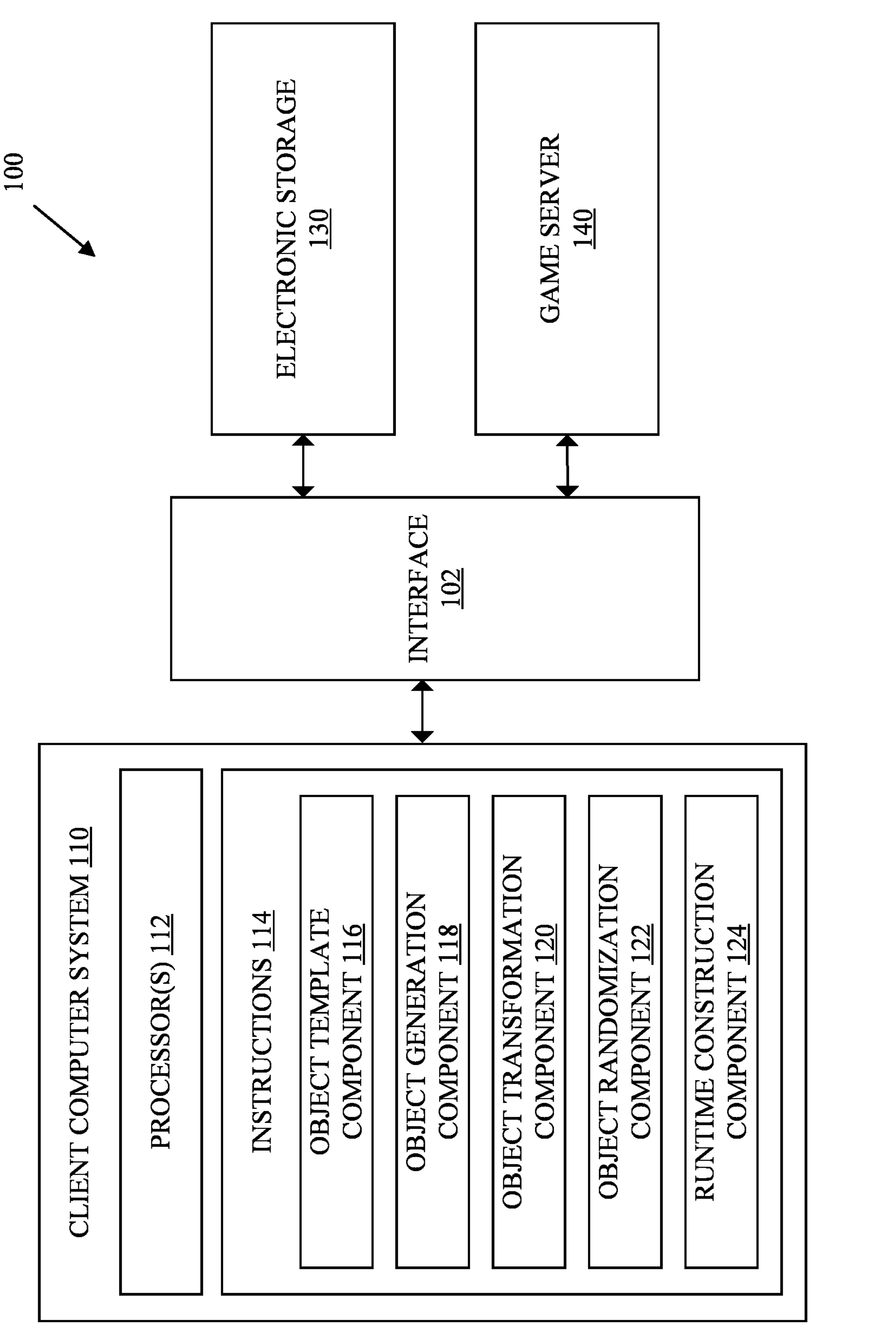
FIG. 1 depicts a block diagram of an example of a system configured to construct during runtime a computer-generated object to be rendered within a three-dimensional virtual scene, according to one or more aspects described herein.

FIG. 1 illustrates an example of a system 100 configured to construct during runtime a computer-generated object to be rendered within a three-dimensional virtual scene, according to one or more aspects described herein. In various implementations, system 100 may include one or more of interface 102, a client computer system 110, electronic storage 130, a game server 140, and/or other components. In some implementations, client computer system 110 may be configured to receive instructions and game data related to an online game comprising three-dimensional virtual scenes from game server 140. In various implementations, computer system 110 may include one or more physical processors 112 (also interchangeably referred to herein as processor(s) 112, processor 112, or processors 112 for convenience), computer readable instructions 114, and/or one or more other components. In some implementations, system 100 may include one or more external resources, such as sources of information outside of system 100, external entities participating with system 100, and/or other resources. In various implementations, system 100 may be configured to receive input from or otherwise interact with one or more users via client computer system 110 and/or game server 140.

In various implementations, physical processor(s) 112 may be configured to provide information processing capabilities in system 100. As such, the processor(s) 112 may comprise one or more of a digital processor, an analog processor, a digital circuit designed to process information, a central processing unit, a graphics processing unit, a microcontroller, a microprocessor, a field programmable gate array (FPGA), an application specific transformed circuit (ASIC), a System on a Chip (SoC), and/or other mechanisms for electronically processing information. Processor(s) 112 may be configured to execute one or more computer readable instructions 114. Computer readable instructions 114 may include one or more computer program components. In various implementations, computer readable instructions 114 may include one or more of an object template component 116, an object generation component 118, an object transformation component 120, an object randomization component 122, a runtime construction component 124, and/or other computer program components. As used herein, for convenience, the various computer readable instructions 114 will be described as performing an operation, when, in fact, the various instructions program the processor(s) 112 (and therefore system 100) to perform the operation.

In various implementations, object template component 116 may be configured to store one or more sets of meshes and/or textures which may be used to construct objects to be rendered within a three-dimensional virtual scene. As used herein, the term "mesh" may be understood to encompass both meshes and sub-meshes. In various implementations, each set of stored meshes and/or textures may comprise one or more non-resizable meshes and one or more resizable meshes. In various implementations, each resizable mesh may be resizable in one dimension (i.e., linearly resizable) or resizable in two dimensions. In various implementations, the objects to be rendered within the three-dimensional virtual scene may comprise objects having a regular structure. For example, the objects may comprise buildings, roads, walls, fences, power and/or phone lines, bridges, tunnels, and/or any other structures to be rendered within a three-dimensional scene that have a regular structure.

Figure 2:
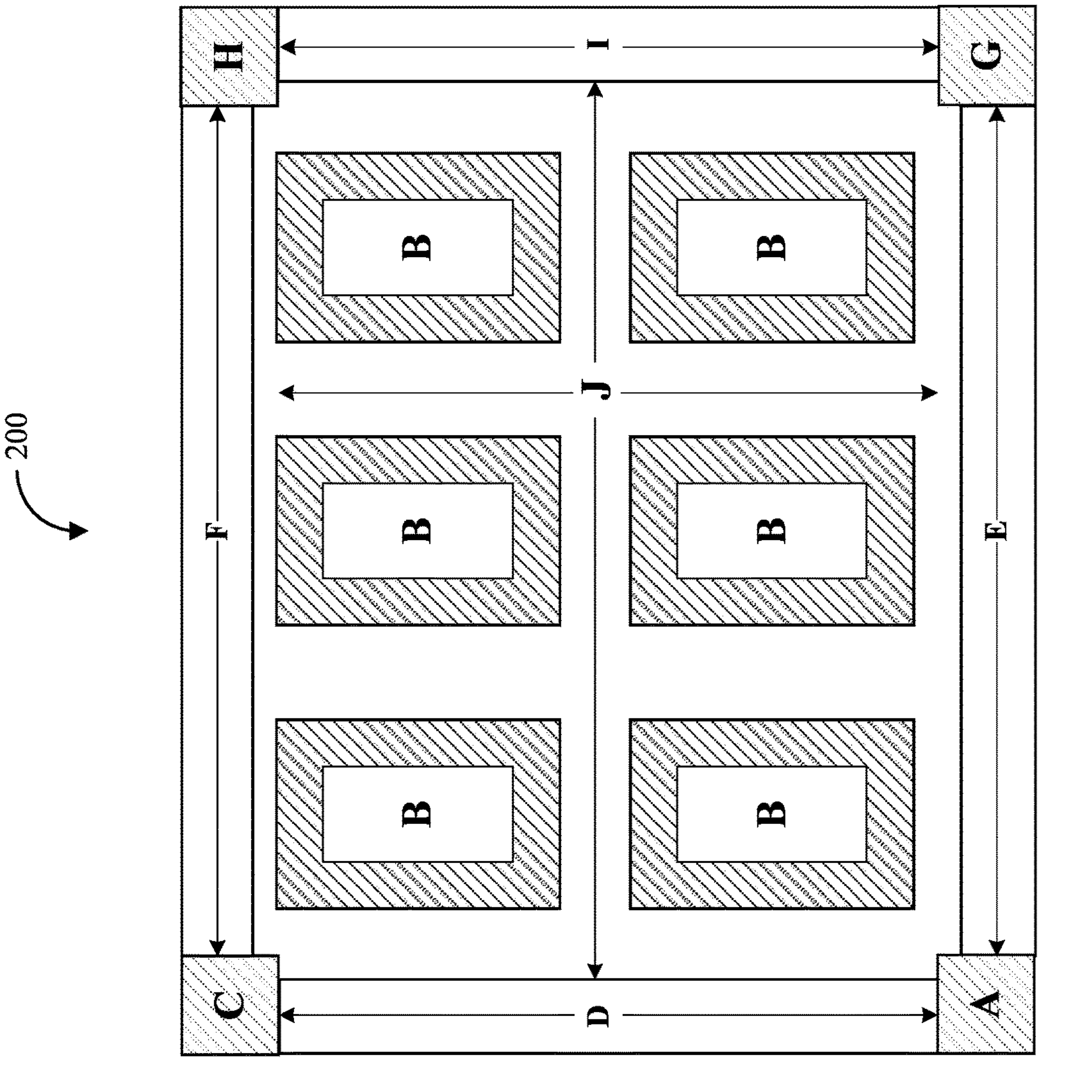
FIG. 2 depicts a pictorial diagram of an example target three-dimensional model for a building to be rendered within a three-dimensional virtual scene, according to one or more aspects described herein.
Figure 3:
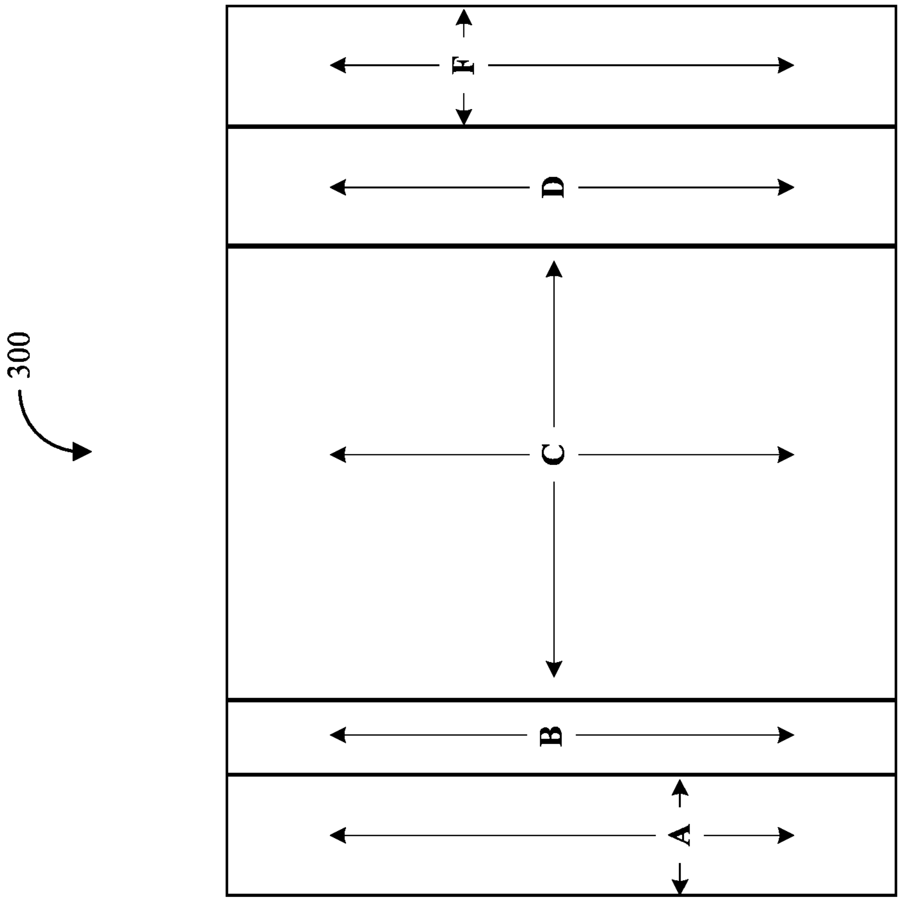
FIG. 3 depicts a pictorial diagram of an example target three-dimensional model for a road to be rendered within a three-dimensional virtual scene, according to one or more aspects described herein.

FIG. 2 and FIG. 3 depict examples of target three-dimensional models that may be constructed from the stored meshes and/or textures using the methods described herein. FIG. 2 illustrates an example of a mesh 200, which may be used to form a target three-dimensional model of a building to be rendered within a three-dimensional virtual scene, wherein mesh 200 may be constructed according to one or more aspects described herein. Specifically, FIG. 2 depicts a façade projection of the target mesh 200. In various implementations, target mesh 200 may be constructed by combining multiple non-resizable stored meshes (e.g., meshes A, B, C, G, and H) and multiple resizable stored meshes (e.g., meshes D, E, F, I, and J). For example, as shown in FIG. 2, windows (e.g., meshes labeled "B") and corner pieces of a building façade (e.g., meshes A, C, G, and H) may be non-resizable because they are the same size regardless of how big the building is. Meanwhile, edges of the building façade (e.g., meshes D, E, F, and I) may be linearly resizable because they have a single dimension that may be resized based on the vertical or horizontal size of the building, and the backdrop of the façade itself (e.g., mesh J) may be resizable in two dimensions because it may need to be resized based on both the vertical and horizontal size of the building. In some implementations, windows of a building façade (e.g., mesh B on FIG. 2) may themselves comprise separate non-resizable and resizable meshes. For example, each window may comprise a set of meshes (and/or textures), such as corners of the window that are non-resizable, sides of the window frame that may be resizable in one dimension, and window glass that may be resizable in two dimensions.

In some implementations, textures may be applied to the target mesh 200 to obtain the target three-dimensional model to be rendered. In some implementations, stored textures may correspond to the stored meshes (such as meshes A-J) described above. In some implementations, stored textures may be resized along with respective meshes. In some implementations, this texture resizing may happen due to existing methods that apply the same UV coordinates to resized mesh.

As another example, FIG. 3 illustrates an example of a target mesh 300, which may be used to form a target three-dimensional model of a road to be rendered within a three-dimensional virtual scene, wherein mesh 300 may be constructed according to one or more aspects described herein. In various implementations, target mesh 300 may be constructed from multiple individual stored meshes. For example, as shown in FIG. 3, mesh 300 may be constructed from sidewalks (e.g., meshes A and F) that are resizable in two directions, curbs (e.g., meshes B and D) that are linearly resizable, and the road itself or road pavement (e.g., mesh C) that is resizable in two directions.

Referring back to FIG. 1, object template component 116 may be configured to receive stored meshes and/or textures for objects to be rendered within a three-dimensional virtual scene from a game server and store the meshes and/or textures in a memory (or on some persistent storage) on the client computer. In some implementations, object template component 116 may be configured to receive and store one or more rules related to the construction of target three-dimensional models based on the stored meshes and/or textures. For example, the one or more rules may identify each stored mesh which may be used to construct a three-dimensional model and indicate whether each mesh is non-resizable, linearly resizable, or resizable in two dimensions. Also, in some implementations one or more of the rules may define how the meshes should be combined. In some implementation, for example, this may be done by using meshes with sub-meshes. In some implementations, the one or more rules to construct a target three-dimensional model may define how the resizable stored textures are to be resized. For example, the one or more rules may indicate that a stored resizable texture must be resized by stretching the texture and that another resizable texture must be resized by tiling the texture. In some embodiments, stored meshes, stored textures, and/or rules may be a part of game client software and may be downloaded to the client computer system as a part of downloading game client software.

In various implementations, object generation component 118 may be configured to generate a three-dimensional object by combining and/or transforming stored meshes and/or textures. In various implementations, object generation component 118 may be configured to generate a three-dimensional object by combining and/or transforming stored meshes and/or textures based on instructions received from a game server. For example, in various implementations, client computer system 110 may be configured to receive, from a game server, an instruction to construct a virtual scene comprising at least one object to be generated based on a target three-dimensional model. In some implementations, the instructions may include a description of a three-dimensional object to be constructed. For example, the instructions may define a three-dimensional object to be constructed as "two-story building with three windows per row and 1 m between windows." In other implementations, the instructions may simply indicate a desired size of a three-dimensional object, with necessary computations for target sizes conducted within client computer system 110 (for example, within object generation component 118).

In various implementations, object generation component 118 may be configured to resize and combine stored meshes and textures to construct a three-dimensional model to be rendered within a virtual scene. For example, object generation component 118 may be configured to resize and combine meshes and textures to produce target mesh 200 (as depicted in FIG. 2), which may be used to render a building with multiple windows within a virtual scene. In some implementations, object generation component 118 may be configured to resize and combine stored meshes to obtain target mesh 200 to produce a building with any required number of levels, any required number of windows per level, and any required spacing between the windows (and/or between windows and walls). For example, based on instructions received (e.g., from a game server), object generation component 118 may be configured to resize and combine stored meshes to produce mesh 200 of a two-story building with three windows per row and 1 m between windows.

In some implementations, object generation component 118 may be configured to resize one or more stored meshes and/or textures to produce the constructed object. To resize a given mesh, object generation component 118 may be configured to scale up or down the mesh along one or two dimensions. To resize a given texture, object generation component 118 may be configured to stretch the texture or tile the texture. In some embodiments, object generation component 118 may stretch the textures using one of existing methods (such as bilinear interpolation, bicubic interpolation, Lánczos interpolation, and/or other existing methods). In other implementations, object generation component 118 may be configured to resize textures by tiling them. For example, object generation component 118 may be configured to resize the texture by repeating the texture to fill a resized space. If a resized space does not correspond to a whole number of tiles (i.e., the resized space is not a whole number multiple of the corresponding space in the target three-dimensional model upon which it is based), object generation component 118 may be configured to fill a space remaining that does not fit the original texture using a only a portion of the original texture (i.e., by cutting the texture) or by stretching at least one "tile" (or all "tiles") to fill the remaining space (e.g., to avoid cutting the texture).

In some implementations, object generation component 118 may be configured to combine one or more stored meshes and/or textures to construct a target three-dimensional model of a desired size. For example, in various implementations, object generation component 118 may be configured to receive instructions indicating a desired horizontal and/or vertical length of an object. Using the desired horizontal and/or vertical length of the object, object generation component 118 may determine how to combine the various stored meshes and/or textures to construct an object having the desired horizontal and/or vertical length. In one non-limiting example, limits may be imposed on minimum/maximum sizes to which certain meshes may be resized, and object generation component 118 may be configured to use such limits to determine the number of meshes to be used (such as number of windows on FIG. 2). In a further example, if there is a limit on a maximum size between the windows being 2 m, then after exceeding this number for a given number of windows, number of windows may be increased to satisfy this limit. Further, object generation component 118 may split remaining available space (for example, evenly) between respective meshes.

In an another example implementation, object generation component 118 may be configured to receive instructions indicating a desired horizontal length of a building to be constructed as shown in FIG. 2. In this example implementation, object generation component 118 may be configured to subtract the horizontal length of the non-resizable or fixed-length meshes (e.g., meshes A and G on FIG. 2) from the desired horizontal length, and divide the remaining space by a horizontal length of the "window" mesh (e.g., mesh B in FIG. 2). Using the foregoing, object generation component 118 may be configured to determine a number of windows which may fully fit within the allotted space according to the desired horizontal length of the building. In some embodiments, an additional limit on the minimum size between the windows may be imposed. In some implementation, object generation component 118 may be configured to calculate the number of windows to include by rounding down the calculated result. Finally, object generation component 118 may be configured to use resizable meshes to fill the remaining space. In various implementation, object generation component 118 may be configured to construct the building façade by including evenly distributed window meshes (e.g., mesh B) and filling the remaining space (e.g., the space remaining after subtracting the horizontal length of the non-resizable or fixed-length meshes) with the mesh corresponding to the backdrop of the building façade itself (e.g., mesh J on FIG. 2) resized to fill the gaps. Similar calculations may also be performed to identify the number and spacing of meshes based on a vertical size of the building. In a similar manner, other objects (such as castle walls, potentially with towers, gates, fences, power and/or phone lines, bridges, tunnels, and/or other structures) may be constructed.

Using the techniques described above, object generation component 118 may be configured to construct other objects, such as castle walls with towers, gates, and/or other non-resizable and resizable components, fences, power and/or phone lines, bridges, tunnels. These techniques may also be used to construct roads and/or intersections with, for example, a target mesh 300 depicted in FIG. 3. For example, based on a desired horizontal and/or vertical length, object generation component 118 may be configured to construct target mesh 300 which corresponds to a road, by resizing the sidewalks and the road itself (e.g., meshes A, C, and F) based on a desired horizontal length of the road and by resizing the sidewalks, curbs, and the road itself (e.g., meshes A, B, C, D, and F) based on a desired vertical length of the road. As described further herein, in some implementations, stored meshes may be resized by applying operators that are determined based on instructions received. For example, in some implementations, object generation component 118 may be configured to resize one or more of the stored meshes in two dimensions by applying a multiplication operator that may be defined as:

$$(x,y) \rightarrow (mx,ny).$$

Applying this multiplication operator to the stored meshes resizable in two dimensions may produce meshes m times linearly resized along an x-axis and n times linearly resized along a y-axis. In some implementations, transformation operators may also be applied to meshes to produce objects having a different shape than the original meshes (e.g., stored meshes).

In various implementations, object transformation component 120 may be configured to transform stored meshes and/or textures to construct a three-dimensional object having a different shape for rendering within a virtual scene. In some implementations, object transformation component 120 may be configured to apply a series of transformations to one or more of the stored meshes to construct a three-dimensional object having a different shape. In various implementations, object transformation component 120 may be configured to select one or more transformations to be applied to transform the shape of an object. For example, object transformation component 120 may be configured to select transformations to apply to stored meshes for a straight road (as shown on FIG. 3) to generate a curved section of the road. In such implementations, the transformations selected may comprise a rectangle-to-trapezoid transformation, a curvature transformation, a rotating transformation, a fan-angle transformation, and/or one or more other transformations. In various implementations, object transformation component 120 may be configured to apply one or more transformations to each of the vertices of a mesh to generate a target three-dimensional model having a different shape for rendering within a virtual scene.

Figure 4A:
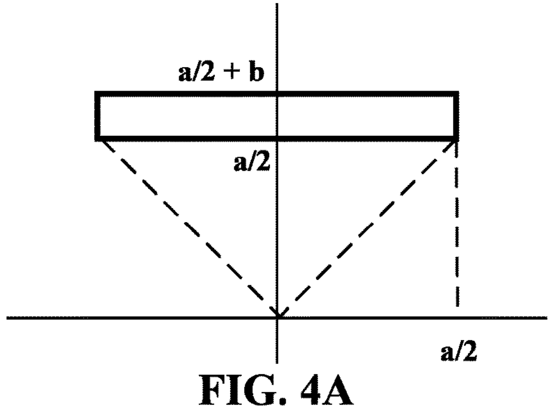
FIGS. 4A-4F depict pictorial diagrams of example transformations to be applied to a mesh to construct a three-dimensional model having a different shape for rendering within a virtual scene, according to one or more aspects described herein.
Figure 4B:
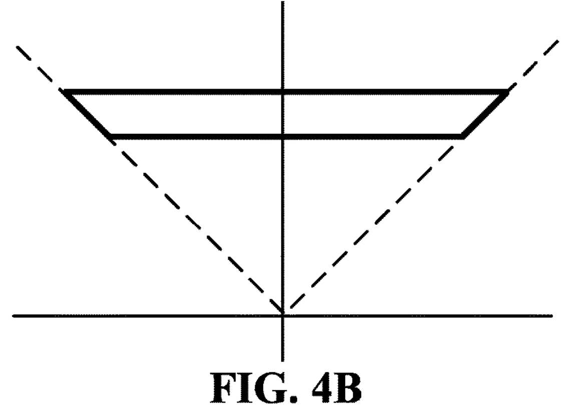
Figure 4C:
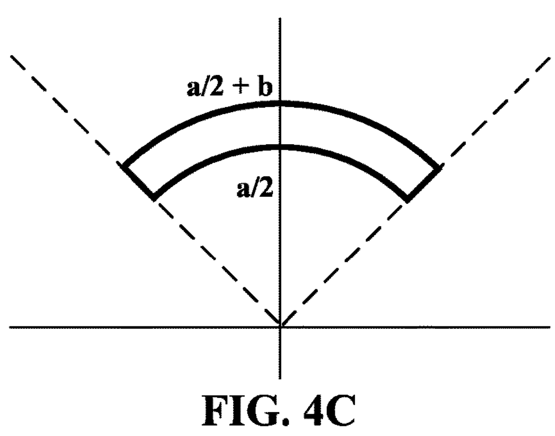
Figure 4D:
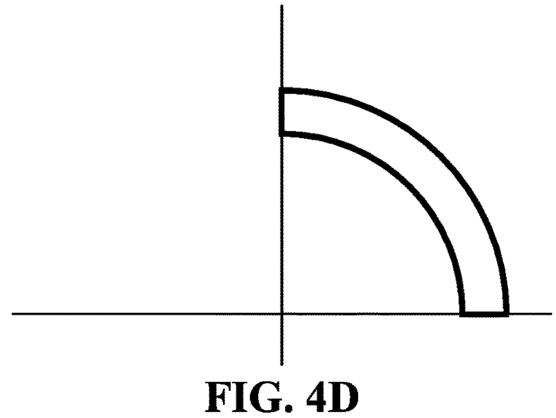
Figure 4E:
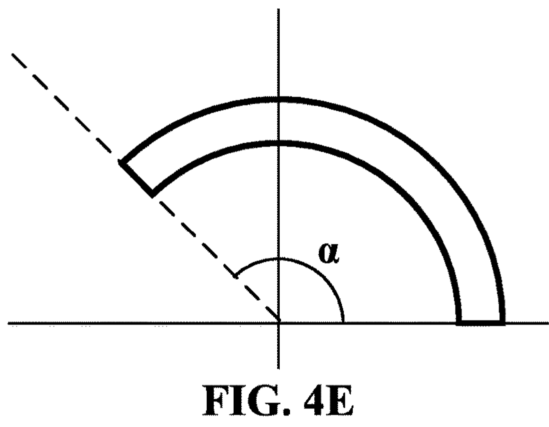
Figure 4F:
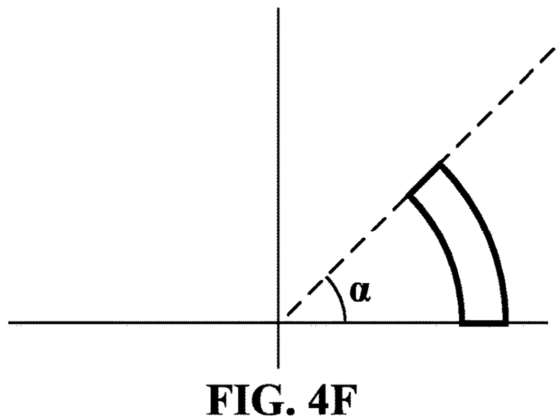

FIGS. 4A-4F illustrate example transformations to be applied to a stored mesh of a straight road to construct a mesh corresponding to a three-dimensional curved piece of road for rendering within a virtual scene, according to one or more aspects described herein. For example, FIG. 4A depicts a straight section of road (shown as a rectangle) that may be the same as or similar to target mesh 300 depicted in FIG. 3. In an example implementation, object transformation component 120 may be configured to apply a series of transformations to the straight section of road depicted in FIG. 4A to generate a transformed curved object with an arbitrary angle α, as shown in FIGS. 4E and 4F.

As shown in FIG. 4B, in some implementations, object transformation component 120 may be configured to apply a rectangle-to-trapezoid transformation to the object shown in FIG. 4A. In such implementations, the rectangle-to-trapezoid transformation may be defined as:

$$(x, y) \to \left(x\left(1 + \frac{y - \frac{a}{2}}{b * \frac{a}{2}}\right), y\right).$$

Applying a rectangle-to-trapezoid transformation to a straight rectangular object produce a trapezoidal object, as shown in FIG. 4B.

As shown in FIG. 4C, in some implementations, object transformation component 120 may be configured to apply a curvature transformation to a trapezoidal object, as shown in FIG. 4B. In such implementations, the curvature transformation may be defined as:

$$(x, y) \to \left(\frac{xy}{2}, y\sqrt{y^2 - \frac{x^2}{2}}\right).$$

Applying a curvature transformation to a trapezoidal object may produce a curved object, as shown in FIG. 4C. In some implementations, the curvature transformation may involve a square root of a $2^{nd}$-degree polynomial of 2-D coordinates.

As shown in FIG. 4D, in some implementations, object transformation component 120 may be configured to apply a rotating transformation to a curved object, as shown in FIG. 4C. In such implementations, the rotating transformation may be defined as:

$$(x, y) \to \left(\frac{x + y}{\sqrt{2}}, \frac{-x + y}{\sqrt{2}}\right).$$

Applying a rotating transformation to a curved object may produce a rotated object, as shown in FIG. 4D.

As shown in FIG. 4E and FIG. 4F, in some implementations, object transformation component 120 may be configured to apply a fan-angle transformation to a rotated object, as shown in FIG. 4E or FIG. 4F. In such implementations, the fan-angle transformation may be defined as:

$$(x, y) \to \left(\sqrt{x^2 + y^2}\cos\left(\frac{2\alpha}{\pi} \cdot \tan^{-1}\left(\frac{y}{x}\right)\right), \sqrt{x^2 + y^2}\sin\left(\frac{2\alpha}{\pi} \cdot \tan^{-1}\left(\frac{y}{x}\right)\right)\right).$$

In some implementations, applying a fan-angle transformation to a curved object may produce a transformed object that includes a fan-angle α greater than 90 degrees, as shown in FIG. 4E. In other implementations, applying a fan-angle transformation to a curved object may produce a transformed object that includes a fan-angle α not greater than 90 degrees, as shown in FIG. 4F.

In various implementations, object transformation component 120 may be configured to apply one or more transformation to each mesh and/or texture of an object to produce a transformed object. In some implementations, transformations to textures may occur as a result of applying existing methods of UV-mapping to map the texture to the mesh. In some implementations, texture transformations may occur even though UV-mapping may remain untransformed merely because mesh vertices were transformed (e.g., using methods described herein with respect to FIGS. 4A-4F). In some implementations, object transformation component 120 may be configured to apply transformations directly to the stored meshes, and/or to the mesh or model obtained as a result of construction by object generation component 118. In some implementations, techniques similar to those described herein for a road may also be applied to one or more meshes for other objects (such as buildings, walls, fences, etc.) to produce curved objects. For example, if a road on which a three-dimensional building is to be placed is curved, the building may need be generated with a curved edge to match with the curved road. In such implementations, object transformation component 120 may be configured to apply a sequence of transformations the same as or similar to that described herein (or by other techniques known in the art) to generate a curved building façade to match the shape of the curved road.

In various implementations, object randomization component 122 may be configured to generate three-dimensional objects having a random size and/or appearance. For example, when constructing objects to be rendered in a three-dimensional scene, object randomization component 122 may be configured to randomize one or more parameters associated with the object. In an example implementation, object randomization component 122 may be configured to construct a virtual scene including buildings or roads constructed randomly. In such implementations, the buildings or roads may be displayed at a random position within the three-dimensional scene (e.g., at randomized coordinates), with a random appearance, and/or with a random size. In various implementations, object randomization component 122 may be configured to generate a three-dimensional object having a random size and/or appearance based on one or more pre-defined constraints for that type of object. For example, one or more constraints may be pre-defined and included within rules related to the construction of three-dimensional objects based on stored meshes and/or textures. As described herein, the rules may be received and/or stored in association with stored meshes and/or textures, and/or target three-dimensional models and/or objects to be rendered. In various implementations, the one or more constraints may serve to maintain scene coherence and ensure automatically generated three-dimensional objects adhere to accepted parameters. For example, the one or more constraints for a given three-dimensional object may define, for example, a maximum and/or minimum size of the object, a maximum and/or minimum size of individual dimensions of the object, a set of permissible or impermissible colors and/or textures for the object, and/or one or more other constraints on how the object may be automatically generated with a randomly altered or defined size, appearance and/or position.

In some implementations, object randomization component 122 may be configured to procedurally generate a map with the buildings and/or other objects. For example, object randomization component 122 may be configured to procedurally generate a map with the buildings and/or other objects using methods known in the art, such as, for example, those described in "Map Generator: Implementation Details" by ProbableTrain (last visited Mar. 6, 2024), available at https://github.com/Probable Train/MapGenerator/blob/master/docs/algorithmoverview.md. In such implementations, the methods described herein may be used to generate buildings and/or other objects to fit into spaces allocated on a procedurally-generated map. In this process, it may be important to utilize the ability of the methods described herein to generate buildings (and/or other objects) with exact desired sizes, as described herein. In some implementations, such map generation may occur outside of client computer system 110 and may be passed from the outside, for example, from the game server (e.g., game server 140). In other implementations, such map generation may occur on client computer system 110. In some implementations, object randomization component 122 may be configured to identify a desired size of an object to be rendered in a virtual scene (e.g., based on the space available in the virtual for the object) and resize the set of meshes and/or textures used to generate the corresponding target three-dimensional object such that the target three-dimensional object is the desired size (e.g., so that it fits in the space available (or allocated) in the virtual scene).

In some implementations, object randomization component 122 may be configured to use one or more of the textures with an alpha channel to overlay one or more pre-defined textures over an existing or already applied texture. By doing so, object randomization component 122 may be configured to generate an object with, for example, a blemished and/or defected appearance; other elements (such as, for example, manholes, potholes, drains, etc. for road and road-like objects) may also be generated using this method. In some implementations, object randomization component 122 may be configured to randomly resize a pre-defined texture using techniques described here before applying it. By randomly altering the size, appearance, and/or position of objects within a three-dimensional virtual scene for a game, replay value of the game may be improved.

As noted above, object randomization component 122 may be configured to construct individual objects having a random appearance, size, and/or position for rendering within a virtual scene. In some implementations, object randomization component 122 may also be configured to generate a virtual scene having a random appearance, size, and/or position. For example, in some implementations, object randomization component 122 may be configured to obtain a template for a three-dimensional virtual scene. In such implementations, the template may comprise, for example, a two-dimensional map. In some implementations, such a two-dimensional map may be procedurally generated or hand-crafted. Based on the template, object randomization component 122 may be configured to fill the spaces of the template three-dimensional virtual scene with randomly generated buildings and/or other objects with their sizes fitting pre-defined spaces within the template. Such randomization of the virtual scene may expand the limits of the game in which the scene is displayed by adding variability and thus improving replay value.

In some implementations, object randomization component 122 may be configured to generate an entire layout for a virtual scene in a random or pseudo-random manner. For example, an existing virtual scene or map layout, or a template for a virtual scene or map layout, may be used to generate an entire layout for a virtual scene in a random or pseudo-random manner. In such implementations, object randomization component 122 may be configured to generate buildings with a random appearance and/or size to be placed along pre-defined streets within an existing or template virtual scene or map layout. As used herein, "random" may refer, for example, to obtaining some truc random number from the environment, for example, based on current time or on crypto-API (such as/dev/urandom or CryptGenRandom( ). In contrast, "pseudo-random" may refer to obtaining one starting number (usually referred to as "seed"), with subsequent deterministic generation of the pseudo-random numbers from this "seed." In the case of pseudo-random numbers, it is possible to have a long sequence of the pseudo-random numbers deterministically defined by one single "seed" (which may be, for example, stored within the client computer system 110 or obtained from the game server 140). Thus, using pseudo-random numbers, the whole virtual scene or even sequence of scenes may be deterministically defined by one single "seed." In some implementations, pseudo-randomicity may be used to ensure that, on subsequent visits of the player to the same place within the same game, the scene looks the same, but when the player creates a new game, pseudo-random seed may be changed, ensuring that within this new game, visual scenes are different, which in turn may increase replay value. In some implementations, in order to ensure different players have the same environment in a multiplayer game, the game server (e.g., game server 140) may be configured to send the same pseudo-random seed to different client computer systems 110. In such implementations, so long as generation of the pseudo random-numbers is deterministic, different client computer systems 110 may generate the same virtual scenes from the same seed.

In various implementations, runtime construction component 124 may be configured to generate an output to enable rendering of three-dimensional objects and three-dimensional virtual scenes using one or more techniques described herein. In some implementations, various techniques described herein may be used as part of a game editor to prepare three-dimensional scenes (e.g., urban landscapes) in a random or pseudo-random manner. In such implementations, generated virtual scenes may be exported by using traditional formats such as FBX, gLTF, and/or other similar file formats. In other implementations, as explained herein, the one or more techniques described herein may be used to generate three-dimensional objects and/or virtual scenes using stored meshes and/or textures in runtime on a game client in a random or pseudo-random manner.

In some implementations, stored data, in addition to stored meshes and/or textures, may comprise additional detail or nuance to the various components they include. Using a building façade (such as target mesh 200 in FIG. 2) as an example, stored data may include different windows (including meshes and textures) for different floors. For example, a first window (with corresponding meshes and/or textures) may be used for the first floor and second window (with corresponding meshes and/or textures) may be used for all other floors. In some implementations, a roof may also be added to a building using one or more techniques described herein.

In some implementations, meshes and/or textures for a building may also include additional elements, such as doors, statues, and/or other features that are either resizable or not resizable. In some implementations, additional features added to target three-dimensional model may be obtained from a pre-defined set or library of available additional elements. In this set or library, each available additional element may be defined and/or associated with one or more rules, as described herein. In some implementations, for example, to construct objects with greater detail (e.g., objects appearing at a higher level of detail (LOD)), additional elements may be specified via traditional meshes while still using constructible mesh sets (which may include resizable meshes) for the object itself. In some implementations, a location and/or position of additional elements may be specified for a given object. For example, a position for an additional element to be added to a building façade may specified as "between 2nd and 3rd horizontal window." In other implementations, another location of additional elements may be specified in terms of linear size or percentage of the overall length. In some implementations, additional elements may remove one or more features of the object. For example, adding one or more additional elements may cover one or more other features of the object. For example, if mesh 200 is used, rules for adding a statue may include exclusion of one or more of the windows.

In some implementations, a "negative" mesh may be associated with some of the stored meshes (such as window meshes and/or other negative meshes corresponding to other features). If such a "negative" mesh (which may be, for example, a watertight mesh) is associated with a mesh or feature, the "negative" mesh may be used in the systems and methods described herein to construct a target three-dimensional model. In such implementations, when a stored mesh and/or feature is applied to a target mesh, an associated "negative" mesh may cause those mesh triangles which are present in the target mesh, and which fully or partially reside within the "negative mesh", to become invisible or to be removed entirely from the target mesh. In some implementations, for some or all of those triangles of the target mesh which intersect triangles forming the "negative mesh", these target mesh triangles may be split into two or more parts along the intersection line(s), with those parts of the triangles which reside within the "negative mesh" made invisible or removed, and those parts of the triangles which are outside of the "negative mesh" remaining visible. Thus, in some implementations, object generation component 118 may be configured to identify triangles of a target mesh which intersect triangles forming a negative mesh, split the identified triangles of the target mesh into two or more parts along the intersections lines (i.e., where the triangles of the target mesh intersect with the triangles forming the negative mesh), with those parts of the triangles which reside within the "negative mesh" made invisible or removed, and those parts of the triangles which are outside of the "negative mesh" remaining visible when the target three-dimensional model is rendered. This technique may allow the objects to be constructed with windows (which, when applied to a wall, create a hole in an appropriate place of the wall), niches (with a "negative mesh" effectively making a hole in the wall, and usual non-negative mesh creating new recessed surface), tunnels, and so on.

Electronic storage 130 may include electronic storage media that electronically stores and/or transmits information. The electronic storage media of electronic storage 130 may be provided integrally (i.e., substantially nonremovable) with one or more components of system 100 and/or removable storage that is connectable to one or more components of system 100 via, for example, a port (e.g., USB port, a Firewire port, and/or other port) or a drive (e.g., a disk drive and/or other drive). Electronic storage 130 may include one or more of optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EPROM, EEPROM, RAM, and/or other electrical charge-based storage media), solid-state storage media (e.g., flash drive and/or other solid-state storage media), and/or other electronically readable storage media. Electronic storage 130 may be a separate component within system 100, or electronic storage 130 may be provided integrally with one or more other components of system 100 (e.g., computer system 110 or processor 112). Although electronic storage 130 is shown in FIG. 1 as a single entity, this is for illustrative purposes only. In some implementations, electronic storage 130 may comprise a plurality of storage units. These storage units may be physically located within the same device, or electronic storage 130 may represent storage functionality of a plurality of devices operating in coordination.

Electronic storage 130 may store software algorithms, information determined by processor 112, information received remotely, and/or other information that enables system 100 to function properly. For example, electronic storage 130 may store meshes and/or textures, information relating to one or more target three-dimensional models and/or objects, and/or other information related to the systems and methods described herein.

Game server 140 may comprise a remote server configured to provide instructions and game data related to an online game comprising three-dimensional virtual scenes to client computer system 110. In some implementations, game server 140 may be configured to provide to client computer system 110 instructions related to an online game that include instructions to construct a target three-dimensional model for an object. For example, the instructions may include an instruction to construct a virtual scene comprising at least one object to be generated based on a target three-dimensional model. In some implementations, the instructions may include a description of a three-dimensional object and/or model to be constructed. For example, the instructions may define a three-dimensional object/model to be constructed as "two-story building with three windows per row and 1 m between windows." In other implementations, the instructions may simply indicate a desired size of a three-dimensional object. In various implementations, game server 140 may be configured as a server device (e.g., having one or more server blades, processors, etc.) and/or as another device capable of providing instructions and game data related to an online game to client computer system 110.

Figure 5:
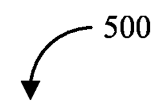
FIG. 5 depicts a flow diagram of an example of a method for constructing on a client computer system a computer-generated three-dimensional object to be rendered within a virtual scene, according to one or more aspects described herein.
Figure 5:
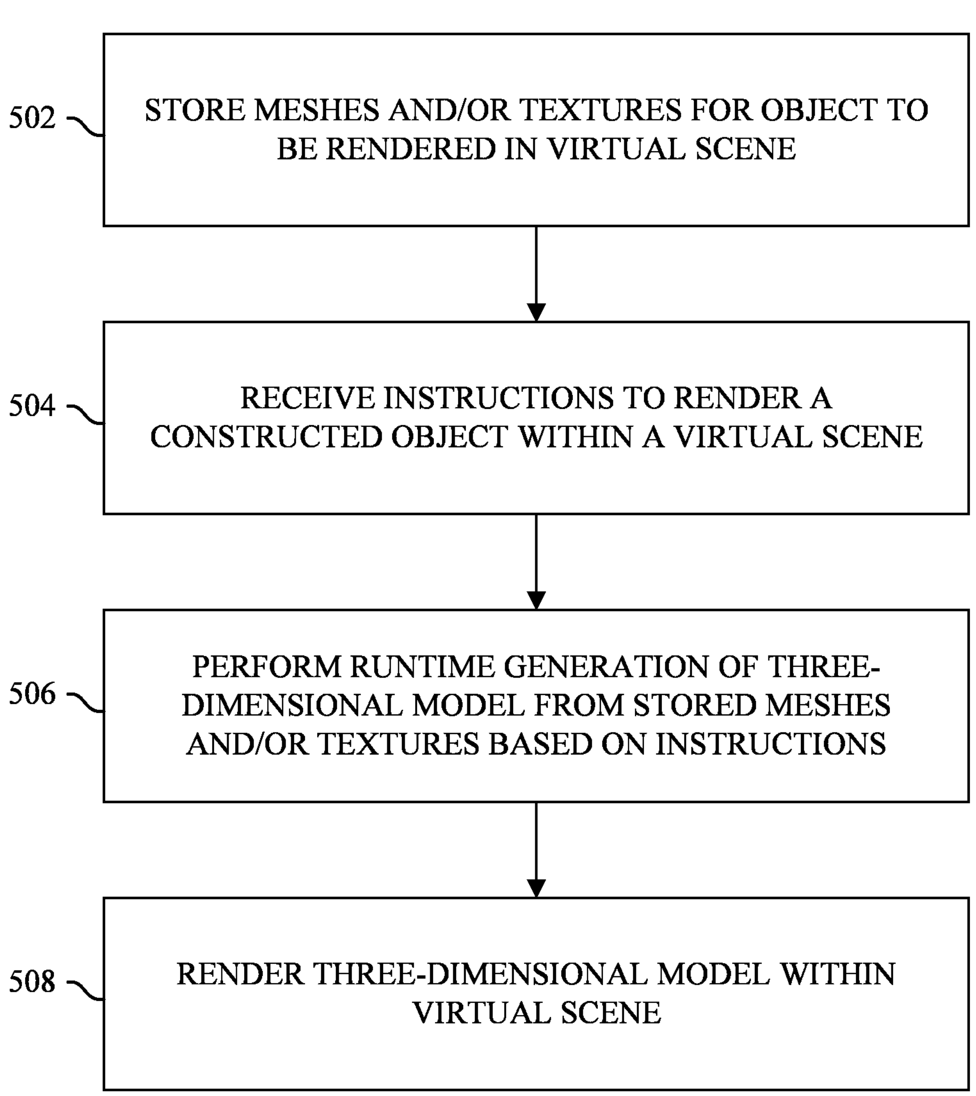

FIG. 5 illustrates an example of a process 500 for constructing on a client computer system a computer-generated three-dimensional object to be rendered within a virtual scene, according to one or more aspects described herein. The operations of process 500 presented below are intended to be illustrative and, as such, should not be viewed as limiting. In some implementations, process 500 may be accomplished with one or more additional operations not described, and/or without one or more of the operations discussed. In some implementations, two or more of the operations of process 500 may occur substantially simultaneously. The described operations may be accomplished using some or all of the system components described in detail above.

In an operation 502, process 500 may include storing meshes and/or textures for an object to be rendered within a three-dimensional virtual scene. In various implementations, the meshes and/or textures may be stored in electronic storage of a client computer system. In various implementations, the meshes and/or textures may be associated with one or more non-resizable portions of the target three-dimensional model and one or more resizable portions of the target three-dimensional model. In some implementations, some of the meshes and/or textures may be resizable in only one dimension, and some of the meshes and/or textures may be resizable in at least two dimensions. In some implementations, the object to be rendered may comprise a building, road, and/or other type of object. In some implementations, several sets of meshes and/or textures—where each set may correspond to an object to be rendered—may be stored by the client computer system to enable the client computer system to render an entire virtual scene at runtime. In some implementations, operation 502 may be performed by a processor component the same as or similar to object template component 116 (shown in FIG. 1 and described herein).

In an operation 504, process 500 may include receiving instructions to render a constructed object within a virtual scene. In various implementations, the instructions may be received by a client computer system from a game server. The instructions may include an indication of a size of the target three-dimensional model and/or the constructed object. In some implementations, the indication of the size of the constructed object and/or target three-dimensional model included within the instructions may comprise a length of a horizontal or vertical dimension of the constructed object and/or target model. In some implementations, the indication of the size of the constructed object included within the instructions may comprise a description of the constructed object based on one or more features of the object. In some implementations, operation 504 may be performed by a processor component the same as or similar to object generation component 118 (shown in FIG. 1 and described herein).

In an operation 506, process 500 may include performing runtime construction of the target three-dimensional model to be rendered, from stored meshes and/or textures based on the received instructions to construct an object based on the stored three-dimensional model. In various implementations, performing runtime construction may include resizing at least one resizable mesh associated with a resizable portion of a target three-dimensional model along one or two dimensions based on instructions received (e.g., from a game server). In some implementations, a texture associated with the mesh may also be resized along one or two dimensions based on the instructions received. In other implementations, a texture associated with the mesh may be tiled based on the instruction received. Tiling the texture may comprise repeating the texture along a horizontal and/or vertical length of the mesh. In some implementations, a number of non-resizable stored meshes and/or textures to include in a constructed target three-dimensional model may be determined, and remaining space may be distributed (for example, evenly distributed) to produce generated target three-dimensional model. In some implementations, a series of transformations may be applied to one or more of the stored meshes to modify their respective shape(s). For example, applying the series of transformations to the stored meshes for the object may produce a curved object. In some implementations, the series of transformations may include applying a $2^{nd}$-degree polynomial of two-dimensional coordinates to the vertices of the stored mesh to obtain target mesh. In various implementations, one or more texture overlays may be applied at a randomized position on a stored texture and applied to the target three-dimensional model. In some implementations, the texture overlay may be randomly resized before being applied to the original texture. In some implementations, the texture overlay may represent defects or blemishes on the object when rendered within a three-dimensional virtual scene. In some implementations, operation 506 may be performed by one or more processor components the same as or similar to object generation component 118, object transformation component 120, and object randomization component 122 (shown in FIG. 1 and described herein).

In an operation 508, process 500 may include rendering the constructed target three-dimensional model within the virtual scene. The constructed target three-dimensional model may be based on the stored meshes and/or textures and include at least one resized mesh. In some implementations, an object using the constructed target three-dimensional model may be included within a random three-dimensional virtual scene comprising objects generated based on a plurality of stored sets of meshes and/or textures. In some implementations, generating the three-dimensional virtual scene may comprise randomizing, for individual objects within the virtual scene, at least one of appearance, size, and position. In some implementations, operation 508 may be performed by a processor component the same as or similar to runtime construction component 124 (shown in FIG. 1 and described herein).

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific example aspects and implementations of the disclosure, and performing certain actions.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application-such as by using any combination of digital processors, analog processors, digital circuits designed to process information, central processing units, graphics processing units, microcontrollers, microprocessors, field programmable gate arrays (FPGAs), application specific transformed circuits (ASICs), a System on a Chip (SoC), and/or other mechanisms for electronically processing information—but such implementation decisions should not be interpreted as causing a departure from the scope of the present invention.

The description of the functionality provided by the different computer-readable instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the computer-readable instructions.

The various instructions described herein may be stored in electronic storage, which may comprise random access memory (RAM), read only memory (ROM), and/or other memory. In some implementations, the various instructions described herein may be stored in electronic storage of one or more components of system 100 and/or accessible via a network (e.g., via the Internet, cloud storage, and/or one or more other networks). The electronic storage may store the computer program instructions (e.g., the aforementioned instructions) to be executed by processor(s) 112 as well as data that may be manipulated by processor(s) 112. The electronic storage may comprise floppy disks, hard disks, optical disks, tapes, or other storage media for storing computer-executable instructions and/or data.

Although illustrated in FIG. 1 as a single component, computer system 110 and client computing device(s) 140 may each include a plurality of individual components (e.g., computer devices) each programmed with at least some of the functions described herein. In this manner, some components of computer system 110 and/or associated client computing device(s) may perform some functions while other components may perform other functions, as would be appreciated. Furthermore, it should be appreciated that although the various instructions are illustrated in FIG. 1 as being co-located within a single processing unit, in implementations in which processor(s) 112 include multiple processing units, one or more instructions may be executed remotely from the other instructions.

Although processor computer system 110, electronic storage 130, and client computing device(s) 140 are shown to be connected to interface 102 in FIG. 1, any communication medium may be used to facilitate interaction between any components of system 100. One or more components of system 100 may communicate with each other through hard-wired communication, wireless communication, or both. In various implementations, one or more components of system 100 may communicate with each other through a network. For example, computer system 110 may wirelessly communicate with electronic storage 130. By way of non-limiting example, wireless communication may include one or more of radio communication, Bluetooth communication, Wi-Fi communication, cellular communication, infrared communication, or other wireless communication. Other types of communications are contemplated by the present disclosure.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered example only, and the scope of the invention is accordingly intended to be limited only by the following claims.

What is claimed is:

1. A computer-implemented method of constructing on a client computer system a computer-generated target three-dimensional model to be rendered within a virtual scene, the method comprising:

storing, by a client computer system, a set of meshes and textures associated with one or more non-resizable portions and one or more resizable portions of a target three-dimensional model, wherein the set of meshes and textures include at least a first mesh associated with a resizable portion of the target three-dimensional model and a second mesh associated with a non-resizable portion of the target three-dimensional object;

receiving, by the client computer system from a game server, instructions to render the target three-dimensional model within a three-dimensional virtual scene, wherein the instructions include an indication of a size of the target three-dimensional model;

resizing, by the client computer system during runtime, at least the first mesh along one or two dimensions based on the instructions received from the game server; and rendering, by the client computer system, the target three-dimensional model based on at least the resized first mesh and the second mesh.

2. The computer-implemented method of claim 1, wherein the target three-dimensional model comprises a building.

3. The computer-implemented method of claim 1, wherein the target three-dimensional model comprises a road.

4. The computer-implemented method of claim 1, wherein the one or more resizable portions comprise portions resizable in only one dimension and portions resizable in at least two dimensions.

5. The computer-implemented method of claim 1, wherein the indication of the size of the target three-dimensional model includes a length of a horizontal or vertical dimension of the target three-dimensional model.

6. The computer-implemented method of claim 1, wherein the instructions to render the target three-dimensional model include a description of the target three-dimensional model based on one or more features of the target three-dimensional model.

7. The computer-implemented method of claim 1, the method further comprising resizing a first texture associated with the first mesh along one or two dimensions based on the instructions received from the game server.

8. The computer-implemented method of claim 1, the method further comprising tiling a first texture associated with the first mesh based on the instructions received from the game server, wherein tiling the first texture comprises repeating the first texture along a horizontal or vertical length of the first mesh.

9. The computer-implemented method of claim 1, the method further comprising determining a number of non-resizable portions of the target three-dimensional model to include in the target three-dimensional model and rendering the target three-dimensional model with the number of non-resizable portions evenly distributed over the target three-dimensional model.

10. The computer-implemented method of claim 1, the method further comprising applying one or more transformations to the stored meshes to modify a shape of the target three-dimensional model.

11. The computer-implemented method of claim 10, wherein applying the one or more transformations to the stored meshes for the object produces a curved object.

12. The computer-implemented method of claim 10, wherein the one or more transformations include applying a $2^{nd}$-degree polynomial of two-dimensional coordinates to one or more of the stored meshes.

13. The computer-implemented method of claim 1, the method further comprising storing, by the client computer system, a plurality of sets of meshes and/or textures, where each of the sets corresponds to one or more three-dimensional models to be rendered within the three-dimensional virtual scene.

14. The computer-implemented method of claim 13, the method further comprising generating, by the client computer system, a random three-dimensional virtual scene comprising objects generated based on the stored plurality of sets of meshes and/or textures.

15. The computer-implemented method of claim 14, wherein generating the random three-dimensional virtual scene comprises randomizing, for individual objects within the virtual scene, at least one of appearance, size, and position.

16. The computer-implemented method of claim 1, the method further comprising applying a texture overlay at a randomized position on a stored texture, wherein the rendered object includes the texture overlay.

17. The computer-implemented method of claim 16, wherein the texture overlay is randomly resized before being applied to the stored texture.

18. The computer-implemented method of claim 16, wherein the texture overlay represents defects or blemishes on the object when rendered within a three-dimensional virtual scene.

19. A system for constructing on a client computer system a computer-generated target three-dimensional model to be rendered within a virtual scene, the system comprising:

one or more processors configured by computer readable instructions to:

store a set of meshes and textures associated with one or more non-resizable portions and one or more resizable portions of a target three-dimensional model, wherein the set of meshes and textures include at least a first mesh associated with a resizable portion of the target three-dimensional model and a second mesh associated with a non-resizable portion of the target three-dimensional object;

receive, from a game server, instructions to render the target three-dimensional model within a three-dimensional virtual scene, wherein the instructions include an indication of a size of the target three-dimensional model;

resize during runtime at least the first mesh along one or two dimensions based on the instructions received from the game server; and render the target three-dimensional model based on at least the resized first mesh and the second mesh.

20. The system of claim 19, wherein the target three-dimensional model comprises a building.

21. The system of claim 19, wherein the target three-dimensional model comprises a road.

22. The system of claim 19, wherein the one or more resizable portions comprise portions resizable in only one dimension and portions resizable in at least two dimensions.

23. The system of claim 19, wherein the indication of the size of the target three-dimensional model includes a length of a horizontal or vertical dimension of the target three-dimensional model.

24. The system of claim 19, wherein the instructions to render the target three-dimensional model include a description of the target three-dimensional model based on one or more features of the target three-dimensional model.

25. The system of claim 19, wherein the one or more processors are further configured to resize a first texture associated with the first mesh along one or two dimensions based on the instructions received from the game server.

26. The system of claim 19, wherein the one or more processors are further configured to tile a first texture associated with the first mesh based on the instructions received from the game server, wherein tiling the first texture comprises repeating the first texture along a horizontal or vertical length of the first mesh.

27. The system of claim 19, wherein the one or more processors are further configured to determine a number of non-resizable portions of the target three-dimensional model to include in the target three-dimensional model and render the target three-dimensional model with the number of non-resizable portions evenly distributed over the target three-dimensional model.

28. The system of claim 19, wherein the one or more processors are further configured to apply one or more transformations to the stored meshes to modify a shape of the target three-dimensional model.

29. The system of claim 28, wherein applying the one or more transformations to the stored meshes for the object produces a curved object.

30. The system of claim 28, wherein the one or more transformations include applying a $2^{nd}$-degree polynomial of two-dimensional coordinates to one or more of the stored meshes.

31. The system of claim 19, wherein the one or more processors are further configured to store a plurality of sets of meshes and/or textures, where each of the sets corresponds to one or more three-dimensional models to be rendered within the three-dimensional virtual scene.

32. The system of claim 31, wherein the one or more processors are further configured to generate a random three-dimensional virtual scene comprising objects generated based on the stored plurality of sets of meshes and/or textures.

33. The system of claim 32, wherein to generate the random three-dimensional virtual scene, the one or more processors are configured to randomize, for individual objects within the virtual scene, at least one of appearance, size, and position.

34. The system of claim 19, wherein the one or more processors are further configured to apply a texture overlay at a randomized position on a stored texture, wherein the rendered object includes the texture overlay.

35. The system of claim 34, wherein the texture overlay is randomly resized before being applied to the stored texture.

36. The system of claim 34, wherein the texture overlay represents defects or blemishes on the object when rendered within a three-dimensional virtual scene.

* * * * *